June 13, 1961 E. H. SCHULTZ 2,988,354
TRANSMISSION CARRIERS
Filed April 1, 1957 3 Sheets-Sheet 1

INVENTOR.
Edward H. Schultz
BY
Morsell & Morsell
ATTORNEYS.

June 13, 1961 — E. H. SCHULTZ — 2,988,354
TRANSMISSION CARRIERS
Filed April 1, 1957 — 3 Sheets-Sheet 2

INVENTOR.
Edward H. Schultz
BY Morsell & Morsell
ATTORNEYS.

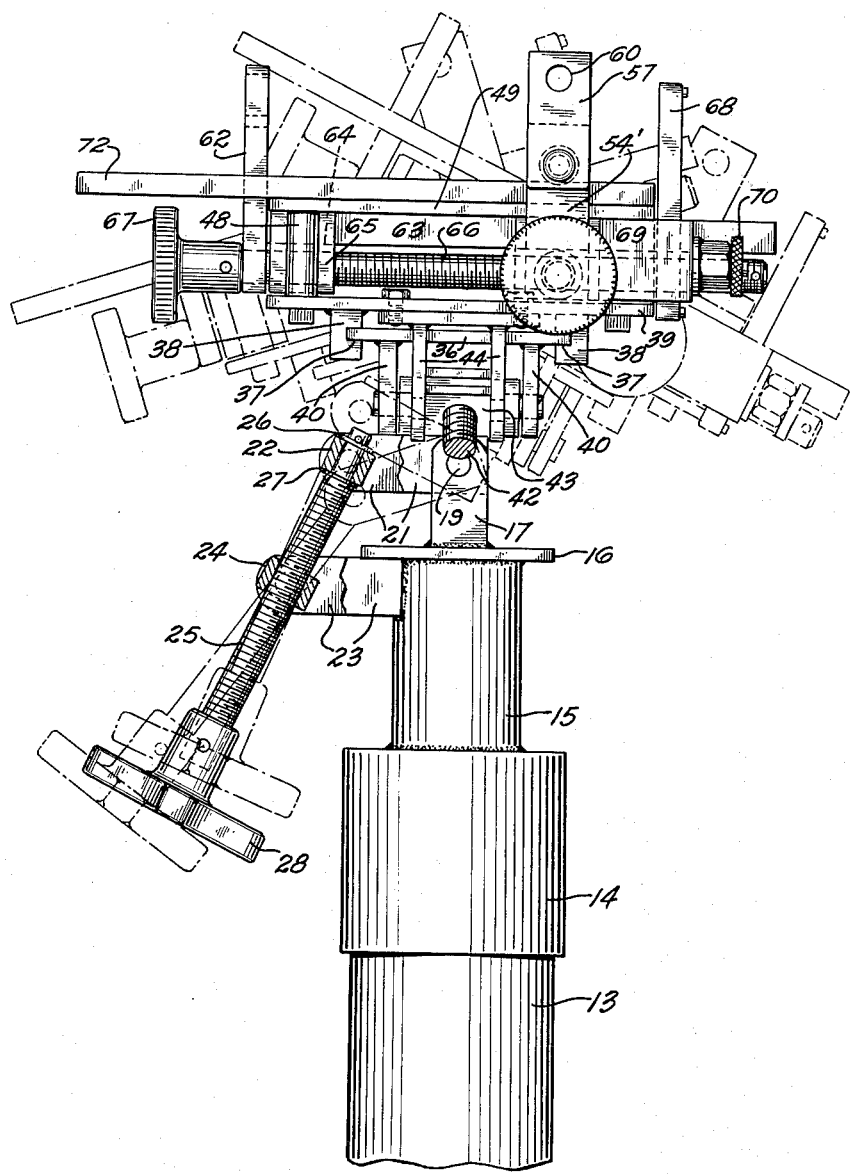

United States Patent Office 2,988,354
Patented June 13, 1961

2,988,354
TRANSMISSION CARRIERS
Edward H. Schultz, 13801 W. Cardinal Parkway, Milwaukee, Wis.
Filed Apr. 1, 1957, Ser. No. 649,961
9 Claims. (Cl. 269—140)

This invention relates to improvements in transmission carriers.

The present invention is particularly adapted for use as a carrier or dolly in the servicing of automobile transmissions. In such servicing it is necessary to support the transmission while it is being removed from the automobile, and also while it is being moved from a position beneath the automobile to a convenient position for servicing. After the servicing has been completed it is necessary to return the transmission to a proper position underneath the car and to accurately support it in properly alined position while the connecting bolts are being inserted. In order to suitably accomplish the above, considering the differences between various makes of automobiles, the transmission holder must be readily adaptable to the particular conditions encountered in servicing a particular car.

Heretofore transmission dollies have been single-purpose tools with the entire investment in the item tied up for more or less occasional use in transmission repair work. Furthermore, these other dollies merely act as trays to support the transmissions and the latter must be chained in place.

It is one object of the present invention to provide a transmission carrier which may be furnished in the form of an adapter for interchangeable use with an hydraulic service jack of the type illustrated in my pending application Serial No. 540,556, filed October 14, 1955, now Patent No. 2,926,888. With this arrangement, when not servicing transmissions, the adapter may be removed and the jack proper used for general jacking purposes.

A further object of the invention is to provide a transmission carrier which is so constructed that it can handle the removal and installation of a great variety of automatic transmissions without necessitating a supply of loose parts to be used for different cars, which parts usually become misplaced when not a permanent part of the transmission carrier.

A further object of the invention is to provide a transmission carrier which is so constructed that it will firmly grip the transmission of any standard car with a screw-operated clamping action so that there is no danger of accidents as the transmission is being removed, handled and reinstalled.

A further object of the invention is to provide a transmission carrier having a relatively small top carrier plate but having strongly braced clamping fingers operated by clamping screws wherein the latter travel in and out with the fingers to materially increase the effective size of the carrier plate. Thus, the unit may be contracted to minimum size while it is being inserted under a car to make it easier to clear obstructions underneath the vehicle such as cross members, braces and the like, the unit being expandable, however, to accommodate any size transmission encountered.

A further object of the invention is to provide a transmission carrier having provision for plural tilting action and for lateral shifting, which movements are useful in bringing about proper alinement of bolt holes during replacement, and also for the purpose of moving or tilting in a desired direction so as to clear obstructions during insertion or removal.

Other objects of the invention are to provide a transmission carrier which is relatively simple in construction, inexpensive, compact, neat in appearance, foolproof in operation, and otherwise well adapted for the purpose described.

With the above and other objects in view, the invention consists of the improved transmission carrier, and all of its parts and combinations, as set forth in the claims, and all equivalents thereof.

In the accompanying drawings, illustrating one complete embodiment of the preferred form of the invention, in which the same reference numerals designate the same parts in all of the views:

FIG. 5 is a side elevational view looking at the right hand side of FIG. 4, the dot and dash lines indicating adjusted positions of the parts.

Figures 1, 2:
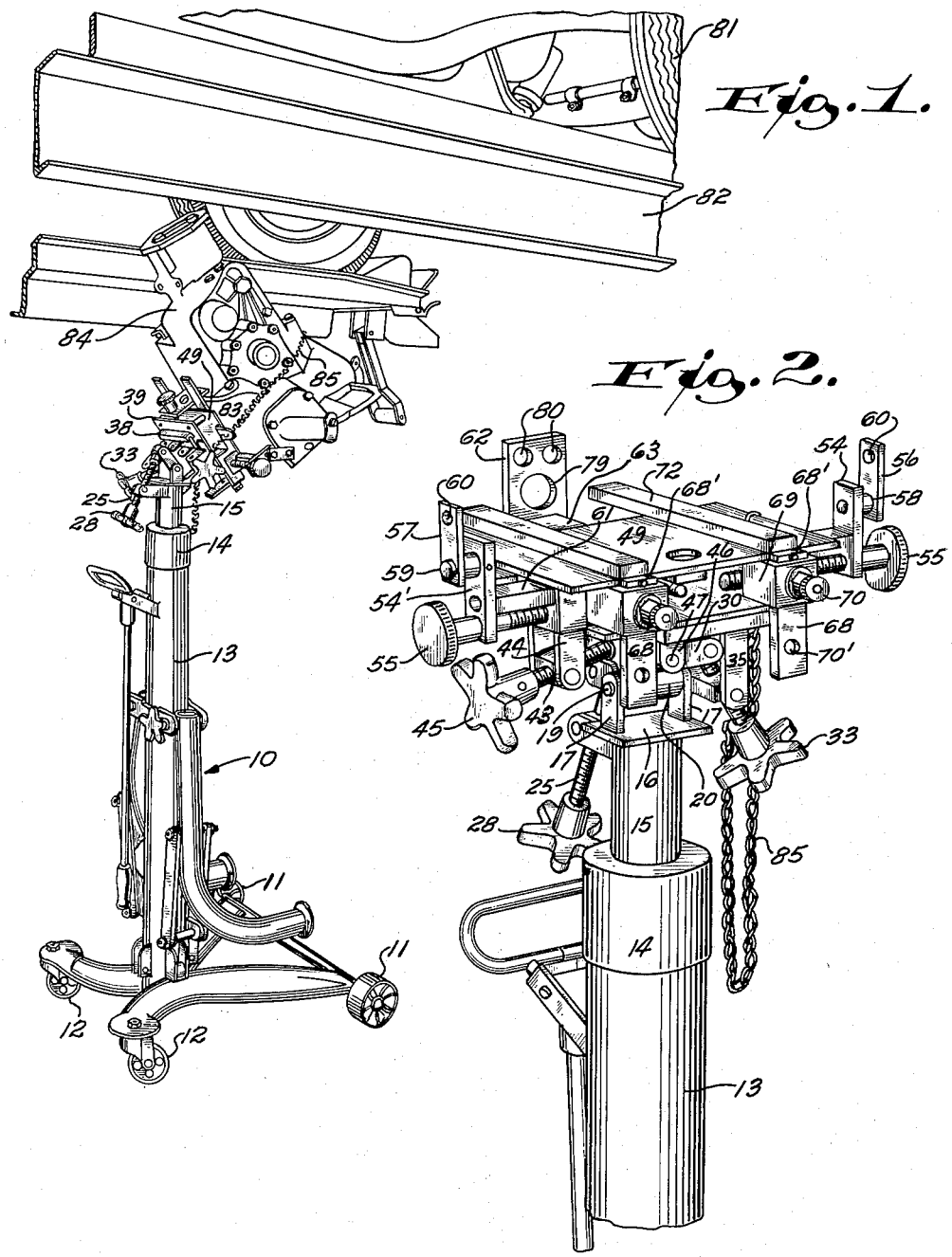
FIG. 1 is a perspective view showing the improved transmission carrier in the form of an adapter connected to an hydraulic service jack of the type shown in my copending application Serial No. 540,556, the carrier being connected to a transmission, and the view showing how the latter may be removed from or returned to position underneath a vehicle, a fragment of a vehicle on a lift being shown.
FIG. 2 is a perspective view looking generally at a 90° angle with respect to the position of FIG. 1 and showing the table in horizontal position, only the upper portion of the service jack being illustrated.

Referring more particularly to the drawings, first to FIG. 1, the numeral 10 designates an hydraulic service jack of the type shown and fully described in my copending application Serial No. 540,556, filed October 19, 1955. The jack proper will not be described in detail herein other than to indicate that it is movable on wheels 11 and caster wheels 12, and includes a vertically extensible member 13 in the form of a cylinder which is actuated hydraulically. Telescoped on the upper end of the extensible member 13 is an adapter sleeve 14 having a pedestal or supporting post 15 projecting upwardly from its top. While the sleeve 14 may be permanently attached to the extensible member 13 of the jack 10 or to the extensible member of any other jack having similar arrangement, nevertheless it is a feature of the present invention to have a snug removable fit with the cylinder 13 so that when not servicing transmissions the jack 10 may be used for general jacking purposes by merely removing the sleeve 14 which supports the transmission carrier.

Welded or otherwise secured to the top of the pedestal 15 is a plate 16, and projecting upwardly from the plate are spaced lugs 17 having pivot apertures 18. Pivoted between the lugs 17 on a pin 19 which pivots in the holes 18 is a pivot block 20 (see FIG. 3) having laterally projecting lugs 21. Pivoted between the outer ends of the lugs 21 is a block 22 (see FIG. 5). Projecting horizontally from the upper portion of the pedestal 15 just below the plate 16 are spaced lugs 23. A nut 24 is suitably pivoted between the lugs 23 and coacts with the threads on a bolt 25. The upper end of the bolt 25 is unthreaded and of reduced diameter and is rotatably connected to the block 22, as shown in FIG. 5. The block 22 is positioned between washers 26 and 27, the latter being seated on the larger diameter threaded portion of the bolt and the former being held in place by a suitable pin, as illustrated in FIG. 5. The lower end of the adjustment bolt 25 is equipped with a hand wheel 28. It is apparent that manipulation of the hand wheel 28 will cause tilting in one direction or the other on the pivot 19 of the block 20 from which the lugs 21 extend.

Figure 3:
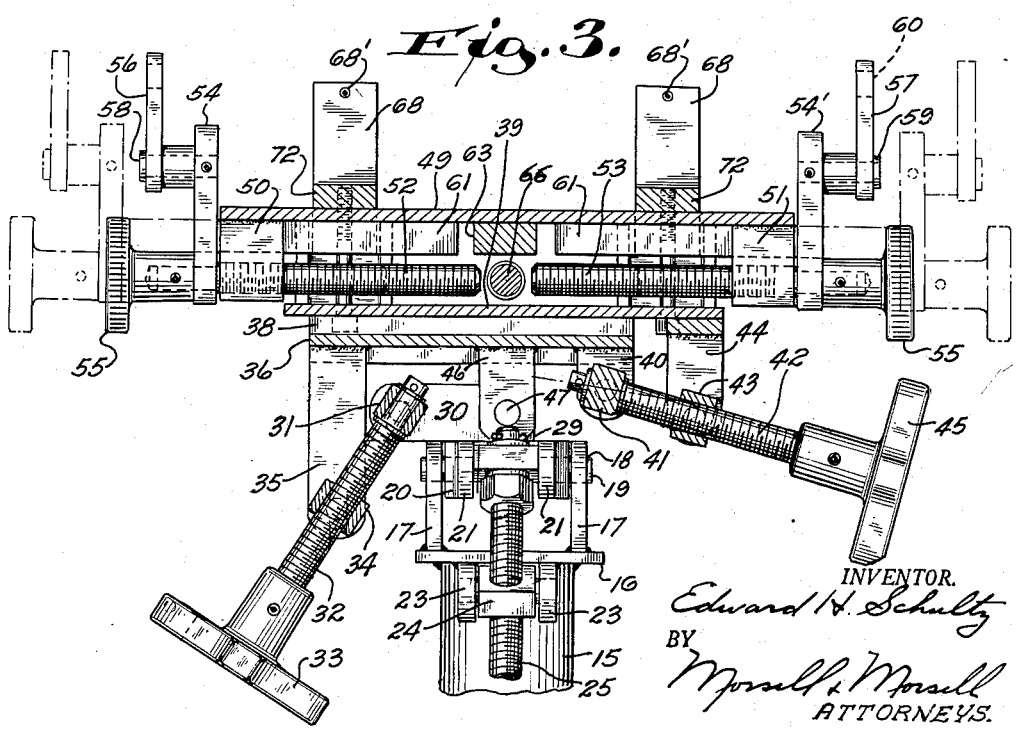
FIG. 3 is a sectional view taken on the line 3—3 of FIG. 4 with the dot and dash lines indicating alternative positions of the parts.

Secured to the top of the block 20 is a block 29 having horizontally projecting lugs 30 (see FIG. 3). Pivotally mounted between the outer ends of the latter is a block 31.

Referring to FIG. 3, a screw 32 having a hand wheel 33 on its lower end has its upper end rotatably connected in the block 31 in the same manner as heretofore described when referring to the connection between the upper end of the bolt 25 and the block 22. The intermediate portion of the bolt 32 has threaded engagement with a nut 34. The latter is pivotally mounted between the lower ends of depending lugs 35. The upper ends of the lugs are welded to the underside of a plate 36, as shown in FIG. 3. The plate 36 has its edges fitted for relative sliding movement in grooves 37 in spaced slide bars 38, as shown in FIG. 5. The bars in turn are welded or otherwise secured to the underside of a base plate 39.

At the opposite end of the plate 36 from the end which carries the lugs 35 are shorter depending lugs 40 (see FIG. 3). A trunnion block 41 is pivoted between the lugs 40 and has the inner end of a screw 42 rotatably connected thereto, as shown in FIG. 3, in the same manner as heretofore described with respect to the connection between the bolt 25 and the block 22. An intermediate portion of the bolt 42 has a threaded connection with a nut 43 which is pivoted between spaced lugs 44, depending from the plate 39, as shown in FIG. 3. The outer end of the screw 42 is equipped with a hand wheel 45. Manipulation of the hand wheel 45 will cause slidable movement of the plate 39 with its depending spaced slide bars 38, which latter have the grooved connection at 37 with the edges of the plate 36 so as to be able to travel along the latter.

Intermediate its length the plate 36 has spaced depending pivot lugs 46. The lower ends of these lugs are pivoted to opposite sides of the block 29 as at 47. As a result of this arrangement, when the hand wheel 33 is manipulated the bolt will cause tilting movement on the pivot 47 to cause tilting of the plate 36 and parts carried thereby in a vertical plane.

Posts 48 (see FIG. 5), preferably four in number, support a top carrier plate or platform 49 in vertically spaced position above the plate 39. Depending from opposite ends of the plate 49 are guide and supporting blocks 50 and 51 (see FIGS. 3 and 4). An adjustment bolt 52 is threaded in the block 50 and an adjustment bolt 53 is threaded in the block 51. A clamping finger 54 has a reduced diameter unthreaded outer portion of the bolt 52 extending rotatably through its lower end, as shown in FIG. 3, the connection being such that the clamping finger 54 moves in and out with the bolt as the latter is manipulated by means of its knurled head 55, an outer position of adjustment being indicated by the dot and dash lines in FIG. 3. A like clamping finger 54' has a similar connection at its lower end with the bolt 53. Extension fingers 56 and 57 are pivoted at their lower ends as at 58 and 59 to upper portions of the clamping fingers 54 and 54', as shown in FIGS. 3 and 5. The upper ends of the fingers 56 and 57 have holes 60 therein (see FIG. 5). The inner portions of the bolts 52 and 53 are accommodated in the space between the plates 39 and 49 as shown in FIG. 3. As the result of this arrangement, the spacing between the clamping fingers 54 and 54' may be varied as indicated by the dot and dash lines in FIG. 3. The upper portions of the blocks 50 and 51 have rectangular openings therethrough for slidably receiving and supporting guide or clamping bars 61 which project inwardly from the clamping fingers 54 and 54'. Thus, the latter are adjustably supported and maintained in upright position.

Referring now to FIG. 5, on the rear side of the carrier there is a rear upwardly projecting clamping finger 62 having an inwardly extending horizontal supporting bar 63 which is slidable in the slot 64 of a nut block 65. An adjustment bolt 66 has threaded connection with the lower portion of the block 65, as shown in FIG. 5, and extends rotatably through the clamping finger 62. The rotatable connection between the lower end of the clamping finger 62 and an unthreaded portion of the bolt 66 is such that the finger is moved in and out with the bolt when the latter is manipulated through the knurled head 67.

Figure 4:
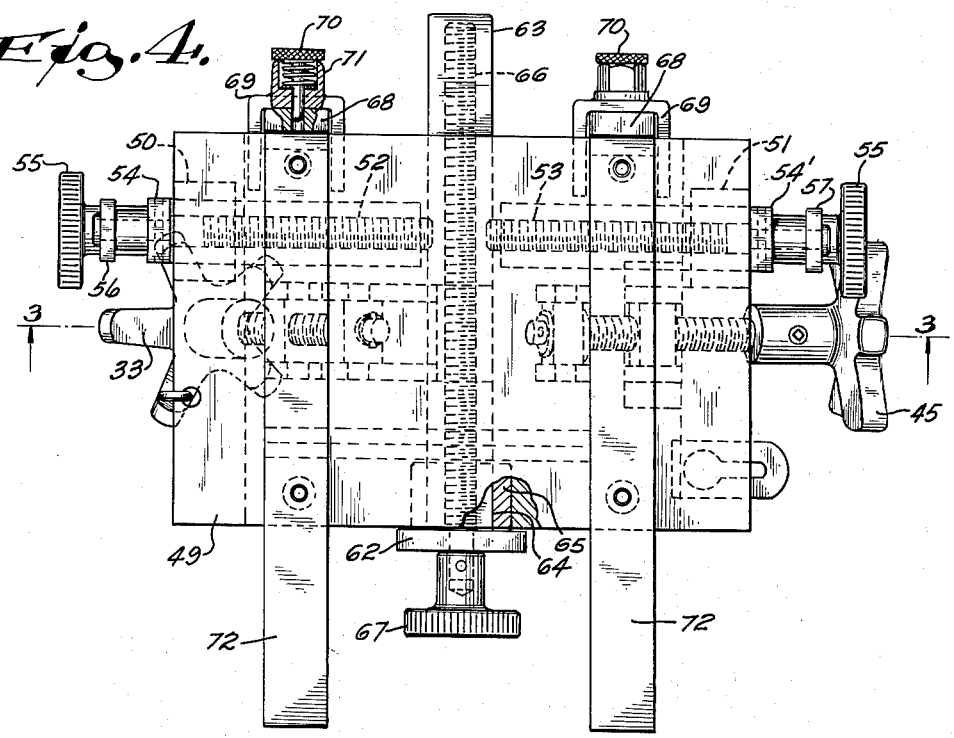
FIG. 4 is a top view of the transmission carrier.

At the opposite edge of the carrier are two front clamping fingers 68 which have their lower ends supported in yokes 69, as shown in FIGS. 2 and 4. Headed pins 70 carried by the lower ends of the yokes are slidable in spring housings 71 and are normally spring-urged to the inward position as shown at the left hand side of FIG. 4. The inner ends of the pins are adapted to register with holes 70' (see FIG. 2) in the lower ends of the clamping fingers 68 to releasably hold the latter in the raised position of FIG. 3 and thus form spring catches 70. If the spring catches 70 are pulled out, the fingers 68 are released and fall down to the inoperative position where they are supported by the stop elements 68' as shown in FIG. 2, where their upper ends are below the level of the rails 72. The latter are suitably secured to the top of the carrier plate 49 and have ends which project from one side as shown in FIG. 5.

It is to be noted from FIG. 4 that the screw 66 is disposed at right angles to the screws 52 and 53 and is adapted to pass between the inner ends of the latter beneath the carrier top. The single clamping finger 62 is equipped with a large hole 79, as shown in FIG. 2, and with two smaller holes 80. In FIG. 4 the clamping finger is shown in its innermost position. By rotating the head 67 in a proper direction, the finger 62 may be adjusted outwardly to a spread position such as shown in FIG. 2.

Operation

With the automobile 81 suitably supported in elevated position on a lift 82 as shown in FIG. 1, the service jack 10 with the transmission adapter thereon is rolled underneath the car to a proper position. For most transmissions the two front vertically slidable clamping fingers 68 are pushed up to the raised position of FIG. 3, and the spring catches 70 are allowed to snap into the holes 70' to hold the fingers in said raised position. Next, the knurled handles 55 are manipulated to spread the oppositely disposed clamping fingers 54 and 54' to the dot and dash line position of FIG. 3. For ordinary uses the extension fingers 56 and 57 are swung to a downward position out-of-the-way. In addition, the knob 67 is manipulated to adjust the rear clamping finger 62 to an outward position as shown in FIG. 2.

Next, the service jack 10 is moved slightly on its wheels to adjust its position with respect to the transmission which is to be removed, and the jack is then manipulated to raise the extension member 13 and transmission carrier until the support rails 72 on the carrier plate 49 contact the bottom pan 83 of a transmission such as the transmission 84. (The latter, however, is still connected to the car and not in the position of FIG. 1.) After the bottom pan of the transmission has been contacted the three clamping screws 55, 55 and 67 are taken up until the pan is securely gripped between the five clamping fingers 54, 54', 68, 68 and 62. In order to bring about proper clamping position the carrier can be tilted forwardly up to 90° or backward up to 20° by manipulation of the screw 25 through the handle 28. This, of course, effects the tilt of the entire unit on the pivots 19. Likewise, the unit can be tilted 15° to the right or to the left by means of the adjusting screw 32 which is manipulated by the hand wheel 33. The screw 42 manipulated by the hand wheel 45, provides a short lateral adjustment by causing a relative sliding movement of the carrier plate 49 with respect to the plate 36 through the medium of the connection in the grooves 37, as shown in FIG. 5. Any one or all of these manipulations may be made to suit conditions.

After the bolts which connect the transmission to the automobile have been removed the service jack can be rolled on its wheels to a position clear of the car, the jack being preferably lowered somewhat to provide more clearance.

To reinstall a transmission a reverse procedure is carried out. During installation the adjustments provided by the screws 32, 42 and 25 are very important as they make it possible to accurately aline and position the transmission with respect to the car so as to bring bolt holes into proper alinement.

During handling, a safety chain 85 may be connected around the transmission as shown in FIG. 1, if desired. However, the clamping fingers grip so firmly that this is usually not necessary.

To use the transmission carrier in connection with certain unusual types of transmissions, such as those on the Chevrolet, it is necessary to lower the two front clamping fingers 68 to the position shown in FIG. 2. This is done by pulling the spring catches 70 outwardly to pull the inner ends of the pins out of the holes 70', allowing the bars to fall by gravity to the position of FIG. 2. It is also necessary to raise the extension fingers 56 and 57 to the position shown in FIG. 2 by pivoting them upwardly on the pivots 58 and 59. The holes 60 in these extension fingers are then caused to engage bolts on the sides of the Chevrolet type transmission. Next, the rear clamping finger 62 is adjusted until the head of the screw at the back of the transmission enters one of the holes 80. Then, by tightening the clamping screws this type of transmission is held securely and can be maneuvered to any position required. It is thus apparent that the device can be adapted for use with specially shaped transmissions merely by simple manipulation of integral parts, and it is therefore unnecessary to carry a stock of loose adapter parts for various cars.

When it is necessary during servicing to unload a transmission from the carrier onto a work bench, the two slidable clamping fingers 68 may be easily released by pulling out on the spring catches 70. Then, with the carrier in a properly tilted position, the transmission can be carefully slid forwardly along the rails 72.

The carrier is such that it provides a firm grip on the transmission due to the novel arrangement of clamping fingers. It is further to be noted that all of the clamping screws, together with their heads, travel in and out with the clamping fingers. Thus, the unit may be readily contracted to minimum size to avoid interference with obstructions beneath an automobile.

When there is no transmission service work in the garage, the adapter sleeve 14 may be pulled off of the upper end of the extension member 13, and the service jack 10 may then be used for general purposes.

It is to be understood that the present invention is not to be limited to the exact details of construction shown and described, for obvious modificaions will occur to persons skilled in the art.

What I claim is:

1. In a carrier having a top supporting plate with opposite edges, a clamping bar having an outer end, means connected to said plate slidably supporting said bar for movement in a plane parallel to the plane of the plate to permit movement of said outer end of the bar to various positions beyond one of said opposite edges of said plate, an upwardly projecting clamping finger outside of the confines of the plate carried by said outer end of said clamping bar, a second upwardly projecting clamping finger outside of the confines of the plate, means connected to the other of said opposite edges of said plate for supporting said second clamping finger, and screw means for causing movement of said bar and first finger to clamp an object on the plate between said two fingers, said screw means including a screw having an outer portion connected to said clamping bar for in and out movement therewith and including means fixed to said plate in which said screw is threaded.

2. In a carrier having a top supporting plate with opposite edges, a clamping bar having an outer end, means connected to said plate slidably supporting said bar for movement in a plane parallel to the plane of the plate to permit movement of said outer end of the bar to various positions beyond one of said opposite edges of said plate, an upwardly projecting clamping finger carried by said outer end of said clamping bar, a second upright clamping finger, means connected to the other of said opposite edges of said plate supporting said second clamping finger for slidable movement in a vertical plane from an upwardly projecting position to a lowered out-of-the-way position, means releasably holding said second finger in said upwardly projecting position against descent by gravity, and screw means connected to the clamping bar and plate for causing movement of said bar and first finger to clamp an object on the plate between said two fingers.

3. In a carrier having a top supporting plate with opposite edges, a clamping bar having an outer end, means connected to said plate slidably supporting said bar for movement in a plane parallel to the plane of the plate to permit movement of said outer end of the bar to various positions beyond one of said opposite edges of said plate, an upwardly projecting clamping finger carried by said outer end of said clamping bar, a second upright clamping finger, means connected to the other of said opposite edges of said plate supporting said second clamping finger for slidable movement in a vertical plane from an upwardly projecting position to a lowered out-of-the-way position, means releasably holding said second finger in said upwardly projecting position against descent by gravity, and screw means for causing movement of said bar and first finger to clamp an object on the plate between said two fingers, said screw means including a screw having an outer portion connected to said clamping bar for in and out movement therewith and including means fixed to said plate in which said screw is threaded.

4. In a carrier having a top supporting plate with opposite edges, a block fixed to and depending from said plate and having a rectangular opening and having a threaded opening, a clamping bar slidably supported in said rectangular opening for movement in a plane parallel to the plane of the plate to permit movement of said outer end of the bar to various positions beyond one of said opposite edges of said plate, an upwardly projecting clamping finger carried by said outer end of said bar, a second upwardly projecting clamping finger, means connected to the other of said opposite edges of said plate for supporting said second clamping finger, and a screw threaded in said threaded opening of the block and having an outer portion rotatably connected to said first clamping finger and movable inwardly and outwardly therewith for causing movement of said bar and first finger to clamp an object on the plate between said two fingers.

5. In a carrier having a top supporting plate with opposite edges, two clamping bars, each having an outer end, means connected to said plate slidably supporting said bars for movement in a plane parallel to the plane of the plate to permit projection of said outer ends of the bars in opposite directions to various positions beyond said opposite edges of said plate, an upwardly projecting clamping finger carried by the outer end of each bar, an apertured extension finger pivotally connected to the upper end of each clamping finger, a third upwardly projecting clamping finger, means connected to adjacent another edge of said plate for supporting said third clamping finger, and screw means for causing movement of said bars and fingers connected therewith to clamp an object on the plate between said fingers with bolts on said object receivable in the apertures of said extension fingers, said screw means including screws each having an outer portion connected to a clamping bar for in and out movement therewith and including means fixed to said plate in which said screws are threaded.

6. In a carrier having a top supporting plate with opposite edges, two clamping bars, each having an outer end, means connected to said plate slidably supporting said bars for movement in a plane parallel to the plane of the plate to permit projection of said outer ends of the bars in opposite directions to various positions beyond said opposite edges of said plate, an upwardly projecting clamping finger carried by the outer end of each bar, an apertured extension finger pivotally connected to the upper end of each clamping finger, and screw means for causing movement of said bars and fingers connected therewith to clamp an object on the plate between said fingers with bolts on said object receivable in the apertures of said extension fingers, said screw means including screws each having an outer portion connected to a clamping bar for in and out movement therewith and including means fixed to said plate in which said screws are threaded.

7. In a carrier having a rectangular top supporting plate having four edges, clamping bars slidably supported by said plate for movement in planes parallel to the plane of the plate, there being a bar for each of three edges of said plate extensible to various positions beyond said edges, an upwardly projecting clamping finger carried by the outer end of each of said bars, a clamping finger projecting upwardly from the fourth edge of said plate, and screw means for causing movement of the bars at said first-mentioned edges to clamp an object on the plate between said fingers on the bars and said finger at the fourth edge, said screw means including a screw for each clamping bar having an outer portion connected to the bar for in and out movement therewith and including means fixed to said plate in which said screws are threaded.

8. In a carrier having a rectangular top supporting plate with opposite edges, spaced rails fixed to the top of said plate and having ends projecting from one of said opposite edges thereof, a clamping bar having a clamping finger on its outer end projecting upwardly between said projecting rail ends, means slidably supporting said bar below the plate for extensible movement of its finger to various positions beyond said last mentioned edge of the plate, a clamping finger projecting upwardly from the other of said opposite edges of said plate, and screw means connected to said clamping bar and plate for causing movement of the bar at said first-mentioned edge to clamp an object on the plate between said finger on the bar and said finger at the opposite edge.

9. In a carrier having a rectangular top supporting plate with opposite edges, spaced rails fixed to the top of said plate and having ends projecting from one of said opposite edges thereof, a clamping bar having a clamping finger on its outer end projecting upwardly between said projecting rail ends, means slidably supporting said bar below the plate for extensible movement of its finger to various positions beyond said edge of the plate, a clamping finger movably supported from the other of said opposite edges of said plate for movement from an upwardly projecting position to an inoperative position, screw means connected to the clamping bar and plate for causing movement of the bar at said first-mentioned edge to clamp an object on the plate between said finger on the bar and said finger at the opposite edge.

References Cited in the file of this patent

UNITED STATES PATENTS

| | | |
|---|---|---|
| 1,464,389 | Lancaster | Aug. 7, 1923 |
| 1,490,608 | Gilmour | Apr. 15, 1924 |
| 2,161,909 | Bornmann | June 13, 1939 |
| 2,275,216 | Broccoli | Mar. 3, 1942 |
| 2,430,366 | Porterfield | Nov. 4, 1947 |
| 2,448,535 | Leveira | Sept. 7, 1948 |
| 2,523,734 | Stephenson | Sept. 26, 1950 |
| 2,552,094 | Hamon | May 8, 1951 |
| 2,567,068 | Halmer | Sept. 4, 1951 |
| 2,672,243 | Marsh | Mar. 16, 1954 |
| 2,675,609 | Miller | Apr. 20, 1954 |
| 2,748,459 | Orr | June 5, 1956 |
| 2,756,710 | Faeber | July 31, 1956 |